July 7, 1970

C. A. PLUMLEY 3,519,908

PLURAL MOTOR PATTERN CONTROL SYSTEM
FOR SURFACE TREATING MACHINES

Filed Sept. 19, 1967

Charles A. Plumley
INVENTOR.

BY *Clarence A. O'Brien*
*and Harvey B. Jacobson*
Attorneys

July 7, 1970

C. A. PLUMLEY

3,519,908

PLURAL MOTOR PATTERN CONTROL SYSTEM
FOR SURFACE TREATING MACHINES

Filed Sept. 19, 1967

Charles A. Plumley
INVENTOR.

United States Patent Office 3,519,908
Patented July 7, 1970

3,519,908
PLURAL MOTOR PATTERN CONTROL SYSTEM FOR SURFACE TREATING MACHINES
Charles A. Plumley, Rutland, Vt., assignor to Patch-Wegner Company, Inc., a corporation of Vermont
Filed Sept. 19, 1967, Ser. No. 668,779
Int. Cl. G05b 19/04
U.S. Cl. 318—39    12 Claims

ABSTRACT OF THE DISCLOSURE

A control system for automatic movement of a rotating spindle along a selected path of motion. Two motors respectively impart reciprocatory and unidirectional motion to the spindle. Each motion may be interrupted and timed in accordance with a preselected program under control of motion limit switches and timers. A surface finishing wheel driven by the spindle may thereby be automatically moved across the surface of a large slab in a selected pattern most suitable for the material being finished.

---

This invention relates to a control system for programmed movement of a surface finishing tool and more particularly to controlled motion in a machine performing surface finishing operations on relatively large surfaces of various types of materials.

Surface treating machines are available for grinding, honing and buffing relatively large slabs of materials such as natural stone, synthetic stone, combination of stone and aggregate, glass, metals, plastics, refractories, etc. Such machines feature in common, a vertical spindle carrying a rotating tool or wheel, the spindle being mounted on a movable support so that it may be reciprocated for cross travel motion across the width of the slab as it is unidirectionally moved along the length of the slab by means of the gantry frame on which the spindle support is mounted. In some cases, the reciprocatory cross travel motion may be along the length of the slab and gantry travel along the width of the slab. Such machines will also have facilities for adjusting the height of the spindle and the pressure with which the tool engages the material being finished.

Facilities must of course be provided in connection with the aforementioned surface treating machines, to regulate or control translatory movement of the rotating spindle so as to cover the surface of the slab being treated in a suitable manner. Such translatory movement is generally controlled through two drive motors which respectively impart cross travel motion and gantry motion to the spindle support. Control systems have also been devised for automatically controlling the spindle motion in order to cause movement along a predetermined path. However, such automatic control has severely limited the use of the machine because different materials require or are best treated by translation of the surface treating tool along different paths.

It is accordingly an important object of the present invention to provide a control system which will not only relieve the machine operator from manual control over the drive motors through which translatory movement is imparted to the spindle support but will also permit the operator to select one of several characteristic paths along which the spindle may be automatically translated.

It will be appreciated, that certain materials are best finished by a relatively rapid traverse of its surface in width as the finishing tool is being unidirectionally moved along its length in order to more efficiently remove stock. Other material surfaces should be finished by movement of the finishing tool along more than one characteristic path in order to eliminate scratches. A change in the translatory path for the spindle is also desirable since certain paths of movement will more rapidly throw off the grinding slurry and mud which tends to increase the speed of grinding while other paths are more likely to retain the grinding material and mud for increasing the speed of honing or buffing. Other characteristic paths and certain materials tend to build up heat in the material more rapidly than other paths and thus increase the speed of the finishing operation. Thus, the ability of the control system to be programmed for different characteristic motions and to readily change from one motion pattern to another represents a significant achievement of the present invention.

The control system of the present invention will not only permit the operator to select and change motion patterns but will also permit the operator to adjust each characteristic pattern to meet specific requirements such as the extent of travel, the speed of travel and the frequency and amplitude of reciprocatory movement.

In accordance with the present invention, the drive motors which respectively impart cross travel and gantry motion to the spindle support are automatically programmed for energization and de-energization at different times or energization simultaneously under control of at least two timers having timing cycles of different duration and limit switches, at least two of which effect a reversal of movement so as to cause the spindle to continue motion along a similar path in the opposite direction. Thus, the spindle may be caused to translate along a planar path parallel to the surface of the material being treated. At least six basic characteristic paths are capable of being programmed in the illustrated embodiment.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

GENERAL ARRANGEMENT

Figure 1:
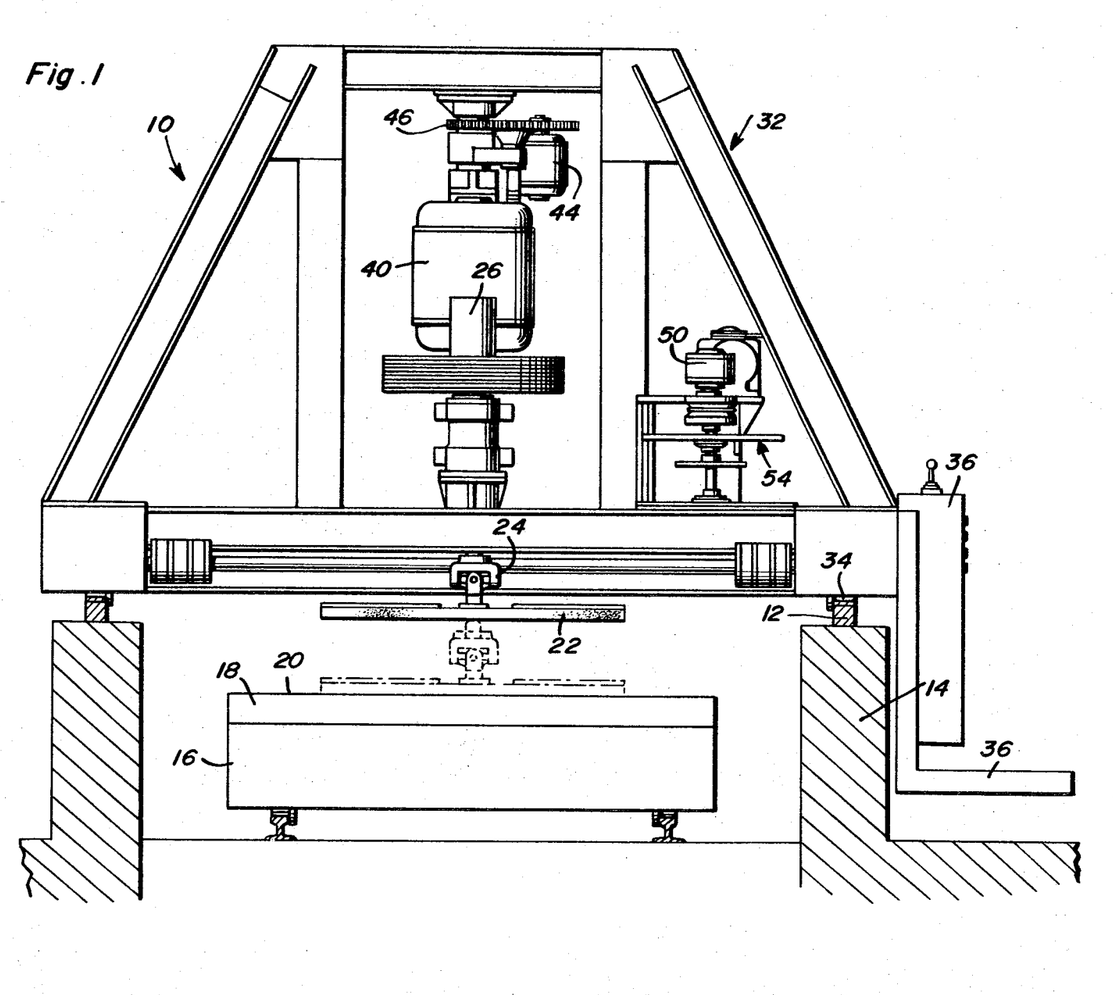
FIG. 1 is a front elevational view of a typical surface treating machine adapted to be controlled by the control system of the present invention.
Figures 2, 3:
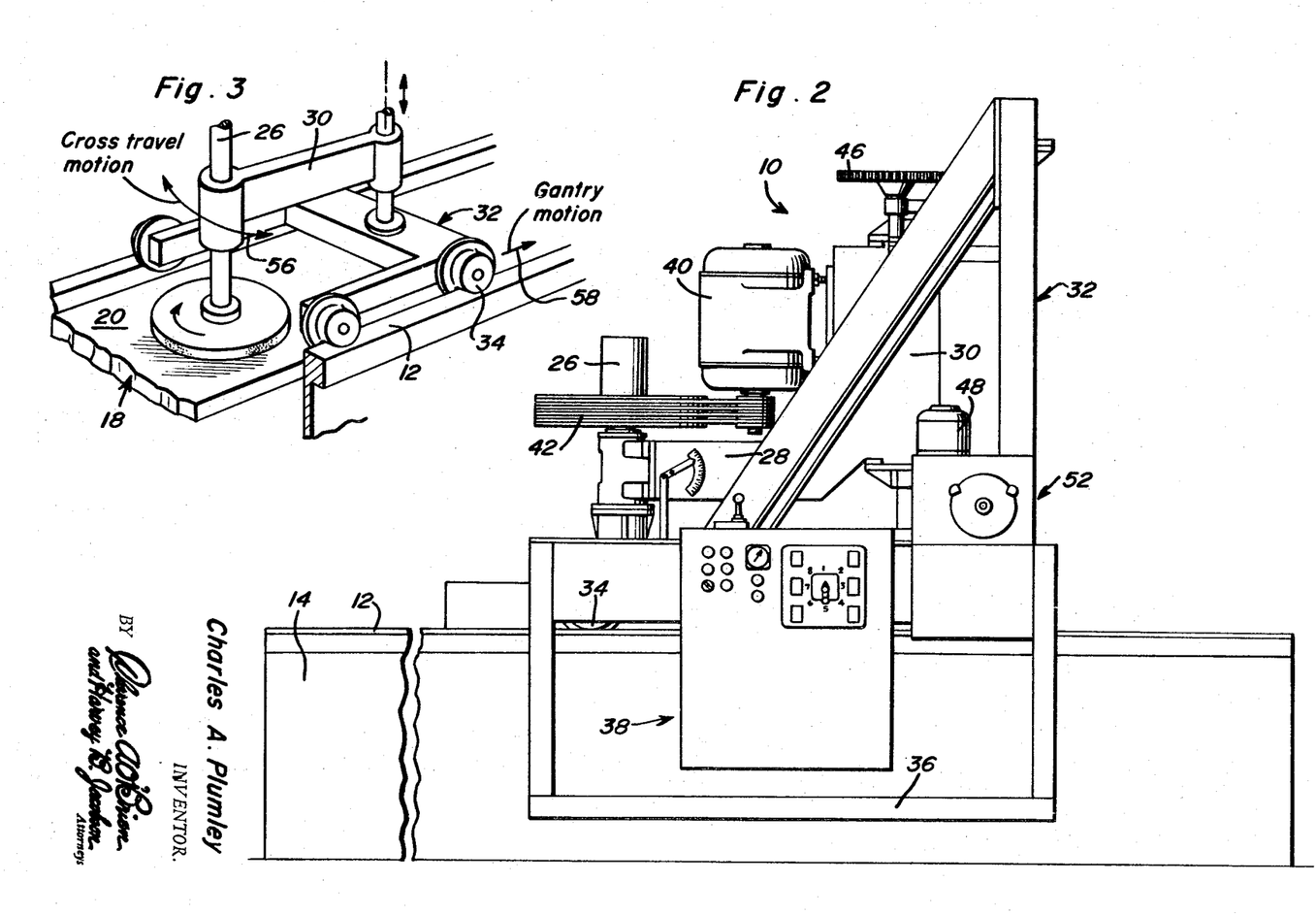
FIG. 2 is a side elevational view of the machine shown in FIG. 1.
FIG. 3 is a simplified perspective view of the machine illustrating the basic movements associated therewith for surface treating purposes.

FIGS. 1 and 2 illustrate a typical surface treating machine generally referred to by reference numeral 10 which is mounted on a pair of parallel spaced tracks 12 supported by a suitable machine bed 14 on either side of a movable support 16 carrying a slab of material 18, the top surface 20 of which is to be surface treated by a grinding wheel 22 for example. The grinding wheel is suspended by means of a universal joint 24 from the lower end of a work spindle 26 rotatably supported at the end of a lower arm portion 28 of a spindle support 30. The spindle support 30 is pivotally mounted about a vertical axis parallel to the rotational axis of the spindle 26 on a gantry frame assembly 32 that straddles the tracks 12 on which it is supported for gantry travel by means of propelling wheels 34. An operator's platform 36 is secured to one side of the gantry frame assembly. Also supported on the same side of the gantry frame assembly at the proper height, is a control box 38 housing the components which form the motor control system of the present invention.

Through the control box, the operator may control energization and de-energization of a spindle drive motor 40 fixedly mounted on the support 30 and drivingly connected by the belt drive 42 to the spindle 26. A height adjusting motor 44 is also mounted on the support 30 and is operative through gearing 46 to raise or lower the spindle support 30 relative to the gantry frame assembly 32. The gantry frame assembly on the other hand fixedly mounts a drive motor 48 which is drivingly connected to the wheels 34 for propelling the frame assembly 32 along the tracks 12 in one direction or the other thereby imparting gantry motion to the surface finishing wheel and spindle. Finally, the gantry frame assembly mounts a drive motor 50 which is drivingly connected through a suitable linkage (not shown) to the spindle support 30 for imparting cross travel motion thereto. Adjustable motion limit mechanisms 52 and 54 are respectively driven by the drive motors 48 and 50 by means of which limits of movement for the machine may be established.

It should be appreciated, that the foregoing description of the machine 10 represents one of several types of surface treating machines well known to those skilled in the art with which the motor control system of the present invention may be associated. Thus, the spindle 26 as illustrated in a more simple manner in FIG. 3, may be translated in two transverse directions consisting of the reciprocatory cross travel motion indicated by arrow 56 produced by energization of the drive motor 50 rotating in one direction and the unidirectional gantry motion indicated by arrow 58 produced by rotation of the drive motor 48 in one direction. Motor 40 of course produces the rotational movement of the spindle 26 about its own rotational axis while the motor 44 when energized will adjust the height of the spindle support 30 in order to accommodate slabs of different thicknesses.

GENERAL OPERATION

All of the drive motors associated with the machine may be controlled by an operator standing on the platform 36 through the control box 38. Thus, as more clearly seen in FIG. 6, operation of the machine may be initiated by actuation of the start push button 60 to energize the spindle drive motor 40 which is stopped by actuation of the stop push button 62. The drive motor 44 is reversible and is controlled by the push buttons 64 and 66 in order to raise or lower the height of the spindle 26. The drive motors 48 and 50 on the other hand for respectively imparting cross travel motion and gantry motion to the spindle are controlled by the manual wobble stick 68 which projects upwardly from the control box for displacement by the operator in perpendicular directions to respectively control directional energization of the drive motors 48 and 50. If desired, an additional control may be provided to change the speed of the motors 48 and 50 where plural speed motors are utilized.

Figure 5:
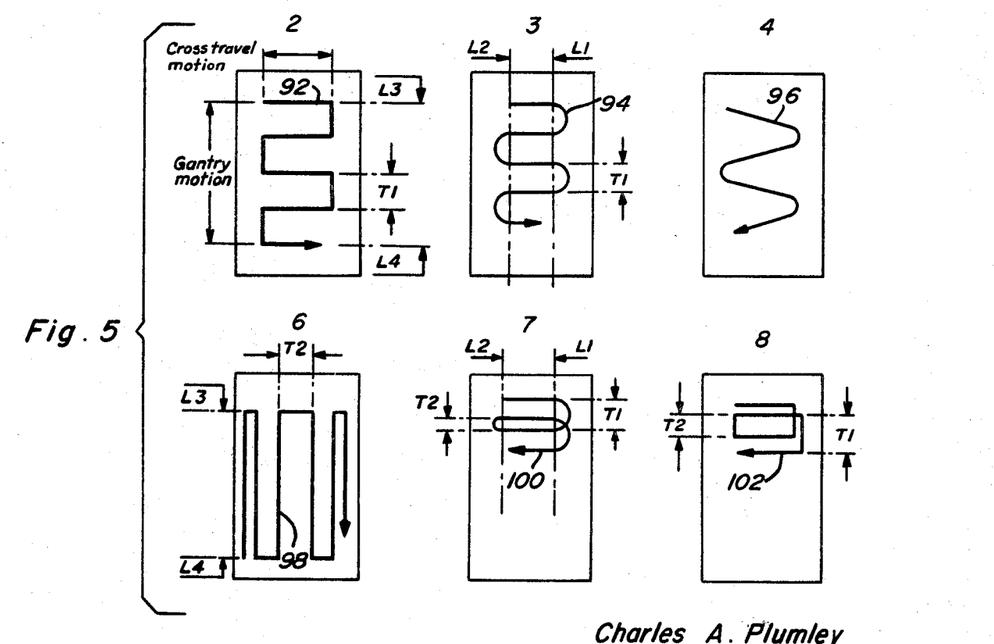
FIG. 5 is a diagrammatic illustration illustrating the several characteristic motion paths capable of being selected through the control system of the present invention.
Figure 6:
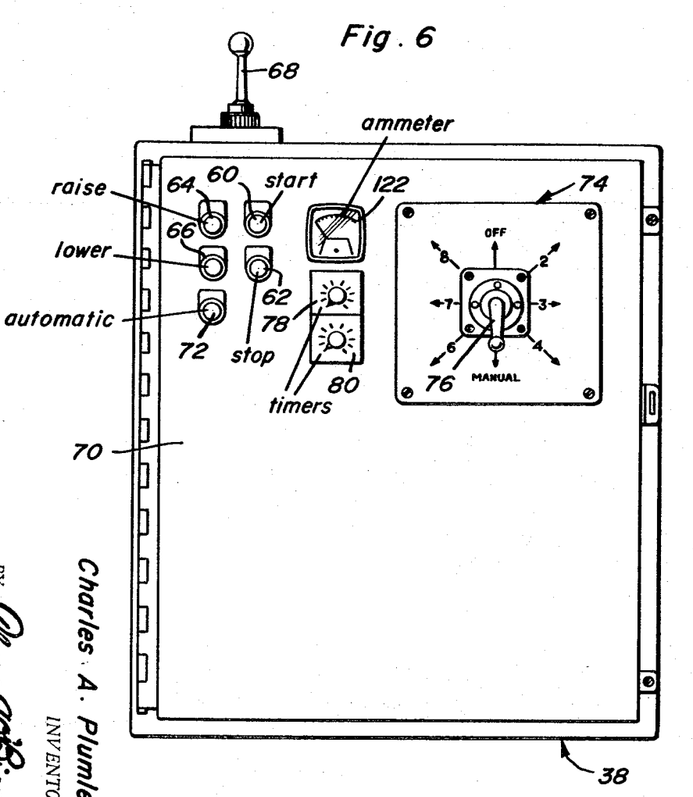
FIG. 6 is an enlarged front elevational view of the control box housing the components associated with the control system.

In addition to the push button switches 60, 62, 64 and 66 mounted on the control panel 70 for controlling operation of the motors, an automatic push button switch 72 is provided in order to replace manual control of the drive motors 48 and 50 by automatic control in accordance with a motion program selected by the operator through the selector switch assembly 74. The selector switch assembly includes a selector arm 76 adapted to be displaced to a plurality of operative positions including an off position and a manual position as illustrated in which control over the drive motors is exercised through the manual wobble stick 68 as aforementioned. The other numbered positions associated with the selector switch assembly 74, six of which are illustrated, will automatically program operation of the drive motors 48 and 50 in order to produce a selected one of the six characteristic motion paths as illustrated in FIG. 5. Each of the motion paths may also be adjusted through the motion limiting devices 52 and 54 aforementioned and by two adjustable cycle timers consisting of a relatively long cycle timer 78 and a relatively short cycle timer 80 mounted on the control panel 70.

Figure 4:
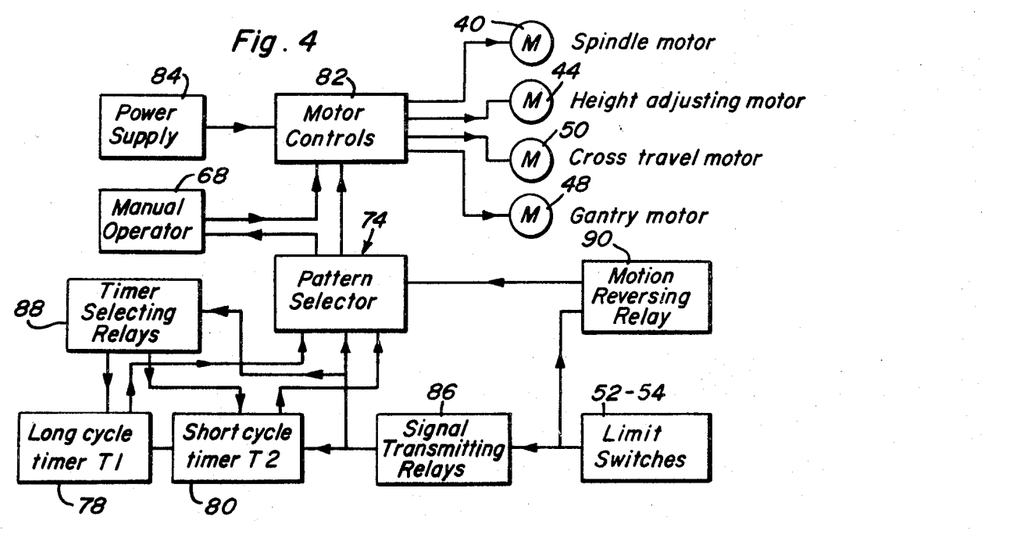
FIG. 4 is a block diagram illustrating the motor control system associated with the present invention for selecting one of several programmed paths of motion.

FIG. 4 diagrammatically shows the control system components housed within the control box 38 including a motor control component 82 through which the motors are energized from the power supply 84. The motor control component 82 is alternatively controlled by the manual operator 68 as aforementioned or automatically controlled through the pattern selector switch assembly 74 through which programming signals are automatically routed to the motor control component. The programming signals are derived from limit switches associated with the motion limit devices 52 and 54 and from the timers 78 and 80. The limit switch signals are converted into programming signals through the signal transmitting relay component 86 which also is operative through the timer selecting relay component 88 to initiate operation of the timers 78 and 80 from which timing signals are dispatched to the selector 74. Signals are also transmitted through the motion reversing relay component 90 to the motor controls from the limit switches in order to cause the spindle to reverse its direction along the selected path when it reaches limit positions at the end of gantry travel. Thus, the path selected will be determined by the various combinations of signals derived from the limit switches and the timers at different times.

As shown in FIG. 5, with the pattern selector 74 in the No. 2 position, a motion path 92 is obtained by interruption of reciprocatory cross travel motion produced by rotation of the cross travel motor 50 in one direction. The cross travel motion is intermittently interrupted as illustrated for periods during which gantry motion is produced by intermittent energization of the gantry motor 48. While limit switches interrupt cross travel motion, the duration of energization for the gantry motor is controlled by the long cycle timer 78. Limit switches however do control reversal of the gantry motor in order to cause retracing of the path from the limit positions. A modified sinusoidal motion path 94 on the other hand is associated with position No. 3 of the selector. This motion path is basically the same as the path 92 except that the cross travel motor 50 is continuously energized.

In view thereof, the path assumes a curvature when the gantry motor 48 is intermittently energized for periods timed by the long cycle timer 78. When both the cross travel and gantry motors are simultaneously and continuously energized, a sinusoidal path 96 is obtained as illustrated in connection with position No. 4 of the selector. The path 98 illustrated in connection with position No. 6 of the selector, involves intermittent, alternate energization of the cross travel and gantry motors as in the case of path 92. However, the short cycle timer 80 is utilized to time the duration of energization of the cross travel motor while the limit switches reverse the gantry motor 48 as the spindle reaches the limit positions associated with gantry travel. An orbital type of path 100 is obtained in connection with position No. 7 of the selector, this path being obtained by intermittent interruption in cross travel motion by the limit switches and alternate timed gantry motion. Gantry motion on one side is however timed by the long cycle timer 78 and on the other side is reversed and timed by the short cycle timer 80 in order to produce the path 100 illustrated. While the cross travel motor 80 is continuously energized in the case of motion path 100, it is intermittently interrupted by the limit switches in the case of motion path 102 associated with the selector position No. 8. It will be apparent therefore, that the different characteristic motion paths are obtained by programming the energization and de-energization of the drive motors 48 and 50 so that both are alternatively energized and de-energized, simultaneously energized, the cross travel motor continuously energized while the gantry motor is intermittently energized and either gantry motion or cross travel motion is timed during intervals between the limit positions.

ELECTRICAL MOTOR CONTROL SYSTEM

Figure 7:
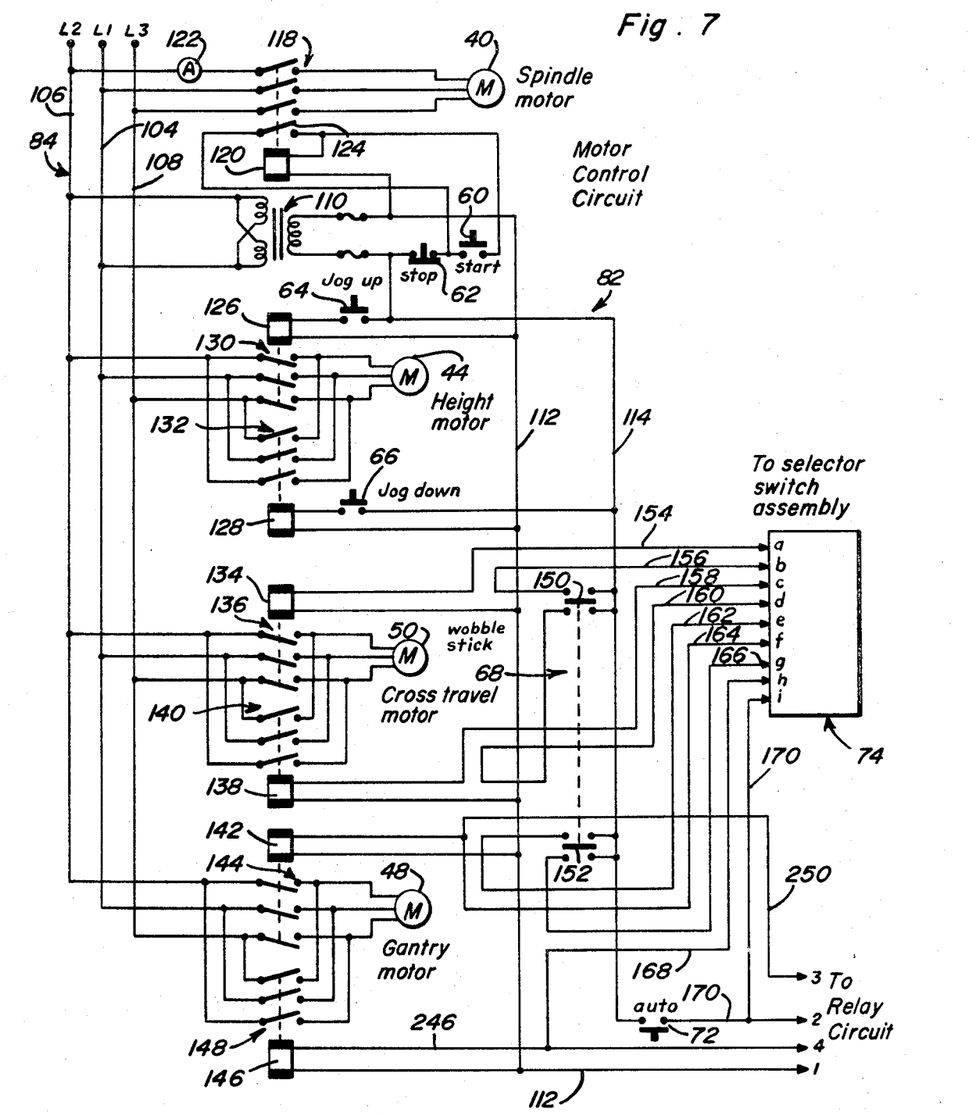
FIGS. 7 through 10 are electrical circuit diagrams illustrating the motor control system in detail.

FIGS. 7 through 10 illustrate a complete electrical circuit for the control system corresponding to the system as diagrammatically illustrated in FIG. 4. FIG. 7 illustrates the details of the motor control component 82 and the power supply 84. The power supply consists of a neutral line 104 and a pair of power lines 106 and 108 as well as a step-down voltage transformer 110, the primary windings of which are connected across the lines 104 and 106 so as to provide a source of low voltage signal current to the voltage supply lines 112 and 114. The drive motors 40, 44, 48 and 50 on the other hand are each provided with three terminals connected directly to the source of electrical energy through the supply lines 104, 106 and 108.

The spindle motor 40 is connected to the power supply lines through the normally opened relay switch section 118 associated with the starting relay 120 also having a normally opened relay holding switch 124. An ammeter 122 is connected in the line between one of the terminals of the motor 40 and the power line 106 for monitoring the load on the motor 40. Upon closing of the start switch 60, which is connected in parallel with the relay holding switch 124, the relay 120 is connected across the secondary of the transformer 110 completing a relay energizing circuit through the normally closed stop switch 62. Thus, rotation is imparted to the grinding wheel or any other finishing tool driven by the spindle motor 40. To stop the surface treating operation, the spindle motor 40 is deenergized by opening the stop switch 62 which de-energizes the starting relay 120 thereby disconnecting the spindle motor from the power lines.

The signal voltage lines 112 and 114 to which the secondary winding of transformer 110 is connected, are also connected to the relays 126 and 128 through the switches 64 and 66 respectively. Energization of the relays 126 and 128 respectively close the normally opened relay switch sections 130 and 132 associated therewith in order to complete energizing circuits for the height adjustment motor 44 causing rotation thereof in one direction or the other. The relay switch sections 130 and 132 when closed accordingly connect the power lines to the reversible motor 44 in reverse order relative to the neutral supply line 104 so that momentary closing of the switch 64 will elevate the spindle whereas momentary closing of the switch 66 will lower the spindle by incremental amounts.

The drive motors 48 and 50 are also of the reversible type, each being controlled by a pair of relay assemblies similar to those described in connection with the height adjustment motor 44. Thus, energization of the relay 134 closing the normally opened relay section 136 associated therewith operates the cross travel motor 50 in one direction whereas energization of the relay 138 closing the relay switch section 140 operates the cross travel motor in the reverse direction. Gantry motion in one direction is produced by energization of the relay 142 closing the normally opened relay switch section 144 to energize the gantry motor 48. Gantry motion in the reverse direction is produced by energization of the relay 146 closing the normally opened relay switch section 148. The voltage line 112 is accordingly connected to the relays 134, 138, 142 and 146 so as to complete energizing circuits therethrough when the two-position switches 150 and 152 associated with the wobble stick control 68, are displaced to one of the two operative positions provided the selector switch assembly 74 is in the manual position. When in the manual position, the selector switch assembly interconnects the conductors 154 and 156 so as to complete an energizing circuit for the relay 134 when the switch 150 is displaced to one of its operative positions. Similarly, the conductors 158 and 160 are interconnected through the selector switch assembly in the manual position so that when the switch 150 is displaced to its other operative position an energizing circuit will be completed for the relay 138. It will be apparent therefore that displacement of the wobble stick 68 in opposite senses from a neutral position along one direction will cause energization of relay 134 or relay 138 in order to directionally control energization of the cross travel motor 50. Similarly, displacement of the wobble stick 68 from a neutral position along a direction perpendicular to the previously mentioned direction will move the switch 152 to its operative positions completing energizing circuits for the relays 142 and 146 when the selector switch assembly 74 is in the manual position. Thus, conductors 162 and 164 from the selector switch assembly are respectively connected to one of the contacts associated with switch 152 and one of the terminals of relay 142 while similar connections to the selector switch assembly are established between another contact of switch 152 and the relay 146 through conductors 166 and 168.

Energization of the relays 134, 142 and 146 may on the other hand be automatically controlled for programmed energization and de-energization of the drive motors 48 and 50 when the selector switch assembly 74 is in one of its automatic positions and the automatic switch 72 is closed so as to connect the voltage line 114 to the relay circuits and the selector switch assembly 74 through signal line 170.

Figure 8:
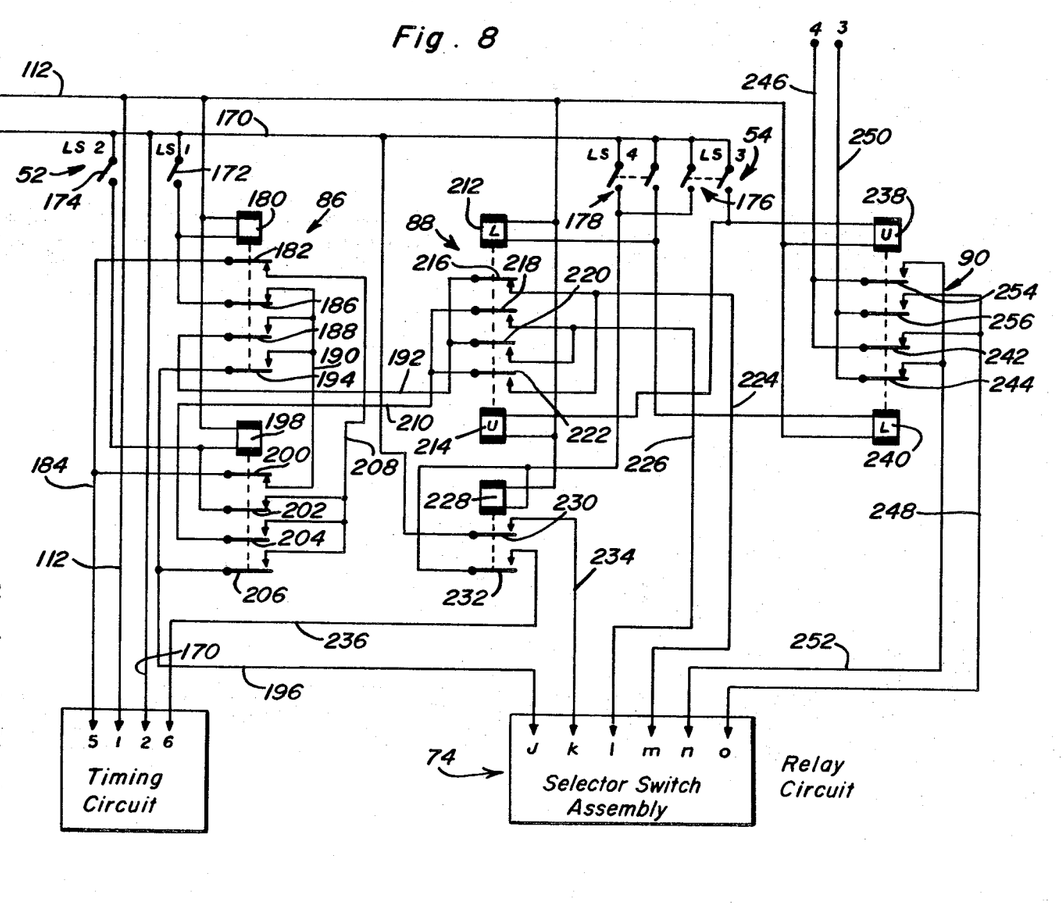

Referring now to FIG. 8, it will be observed that the motion limit device 52 includes a pair of normally opened limit switches 172 and 174 adjustably set to be closed at spaced positions of the spindle adjacent the opposite ends of its reciprocatory stroke. The limit switches 172 and 174 when closed connect the signal line 170 to the signal transmitting relay component 86. The relay component 86 is operative to transmit the signals produced by closing of the cross travel limit switches 172 and 174 to the timers and is also operative to interrupt cross travel motion in certain operative positions of the selector switch assembly 74. The motion limit device 54 on the other hand controls the closing of the ganged switch elements associated with each of the limit switches 176 and 178 at limit positions established for gantry travel. Closing of the gantry motion limit switches 176 and 178 connects the signal line 170 to the motion reversing relay component 90 in all operative positions of the selector switch assembly 74 in order to reverse gantry travel motion to thereby limit movement of the spindle lengthwise of the slab as well as to cause reversal of the selected motion. In accordance with the position of the selector switch assembly, the appropriate timer is selected through the timer selecting relay component 88 energized upon closing of one of the gantry motion limit switches 176 and 178.

The signal transmitting relay component 86 includes a relay 180 connnected across the signal voltage lines 112 and 170 upon closing of the cross travel limit switch 172. A normally closed relay switch 182 is associated with the relay 180 and is connected by conductor 184 to the short cycle timer 78. A normally opened relay holding switch 186 is connected to the relay 180 so as to maintain it energized after opening of the cross travel limit switch 172. Normally opened relay switch 188 is connected through conductor 190 to the normally opened contact associated with relay switch 186 and is connected through conductor 192 to the timer selecting relay component 88. Finally, the normally opened relay switch 194 when closed interconnects the relay switches 188 and 186 through conductor 190 with the selector switch assembly through conductor 196. Also associated with the signal transmitting relay component 86, is the relay 198 having a normally closed relay switch 200 and normally opened relay switches 202, 204 and 206. The relay switch 200 is interconnected between the conductors 184 and 190. The relay 198 is energized upon closing of the cross travel limit switch 174 closing the normally opened relay switch 202 connected to the relay 198 so as to establish a holding circuit. Relay switch 204 is also closed upon energization of the relay 198 so as to connect the normally closed relay switch 182 associated with relay 180 with one of the timers through the timer selecting relay component 88 through the conductors 208 and 210. The conductor 208 is also connected to the open contact of relay switch 202 and that of the normally opened relay switch 206 which is also connected to the selector switch assembly 74 through conductor 196.

The timer selecting relay component 88 includes a latching relay consisting of a latching coil 212 and an unlatching coil 214. The latching and unlatching coils control the positions of a plurality of relay switches including the relay switches 216 and 218 respectively connected to the conductors 192 and 210 from the signal transmitting relay component 86 for initiating timing cycles in the unlatched condition of the relay, the timing cycles being initiated in the latched condition by closing of the relay switches 220 and 222. The relay switch 220 is connected to the conductor 192 whereas the relay switch 222 is connected to the conductor 210. Connections in the reverse order are established between the relay switches and the conductors 224 and 226 to the selector switch assembly 74. Thus, the contacts associated with relay switches 216 and 222 are connected to the conductor 224 while the conductor 226 is connected to the contacts associated with relay switches 218 and 220. The latching relay assembly is thereby operative to select the timer to which the limit switch signal is transmitted for initiating a timing cycle. The latching relay is latched by energization of the latching coil 212 upon closing of only the limit switch 178, while the relay assembly is unlatched by energization of the unlatching relay coil 214 upon closing of the limit switch 176. In certain positions of the selector switch assembly 74, signals derived from closing of the gantry motion limit switches 176 and 178 are also transmitted to the short cycle timer and to interrupt gantry motion through the relay 228 connected across the voltage lines 112 and 170. A pair of normally opened relay switches 230 and 232 are associated with the relay coil 228 so as to respectively establish connections from the voltage line 170 to the selector switch assembly 74 through conductor 234 and from the limit switches 176 and 178 to the short cycle timer 178 through conductor 236.

The motion reversing relay component 90 consists of a latching relay assembly having an unlatching relay coil 238 energized upon closing of the limit switch 176 and a latching relay coil 240 energized upon closing of the limit switch 178. In the unlatched condition, the relay switch 242 connects the gantry motor relay coil 146 to the selector switch assembly through conductors 246 and 248 while the relay switch 244 connects the relay coil 142 to the selector switch assembly through conductors 248 and 250. In the latched condition however, relay switch 254 interconnects the conductors 246 and 252 while the relay switch 256 interconnects the conductors 250 and 248. It will become apparent therefore that latching or unlatching of the motion reversing relay component 90 by means of the gantry motion limit switches 176 and 178, will alternatively energize and de-energize the relays 142 and 146 through which the gantry motor 48 reverses gantry travel.

Figure 10:
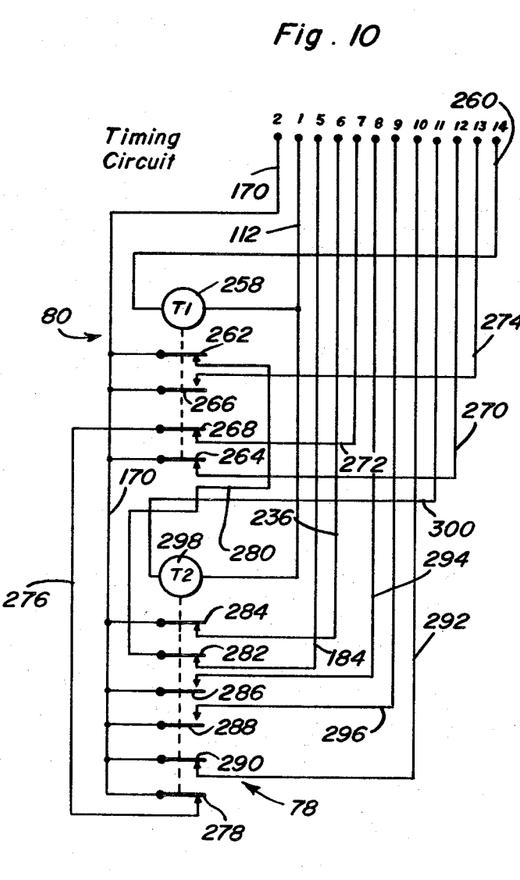

Referring now to FIG. 10, the timer components 78 and 80 form part of a timing circuit to which the relay components 86 and 88 are connected through conductors 184 and 236 as aforementioned. The long cycle timer 80 includes a timing motor 258 connected to the voltage line 112 and adapted to be energized under control of the selector switch assembly through conductor 260. The voltage line 170 is connected to the normally closed timing switches 262, and 264 associated with the timer 80 and to the normally opened timer switch 266. Also, a normally closed timer switch 268 is associated with the timer 80. The normally closed contacts of the timer switches 264 and 268 are connected to the selector switch assembly through conductors 270 and 272 while during a timing cycle, the voltage signal line 170 is connected through the timer switch 266 to the selector switch assembly through conductor 274. The normally closed timer switch 268 associated with timer 80 is interconnected through conductor 276 with the normally closed timer switch 278 associated with the timer 78 while the normally closed timer switch 262 of timer 80 is interconnected through conductor 280 with the normally closed timer switch 282 associated with timer 78. The voltage line 170 is also connected to the timer switch 278 and to the other timer switches 284, 286, 288 and 290 associated with timer 78. The timer switch 284 normally connects the voltage line 170 to the conductor 236 from the relay component 88 while the timer switch 282 is normally connected to the conductor 184 from the relay component 86. The voltage line 170 is also connected by the timer switch 290 to the selector switch assembly through conductor 292. During the timing cycle associated with timer 78, the timer switches 286 and 288 are respectively connected to the selector switch assembly through conductors 294 and 296. The timing cycle of the timer 78 is initiated by energization of the timer motor 298 connected to voltage line 112 under control of the selector switch assembly through conductor 300. It will be apparent therefore that the timing cycles associated with the timers 78 and 80 are controlled by the selector switch assembly 74 and the relay components 86 and 88.

Figure 9:
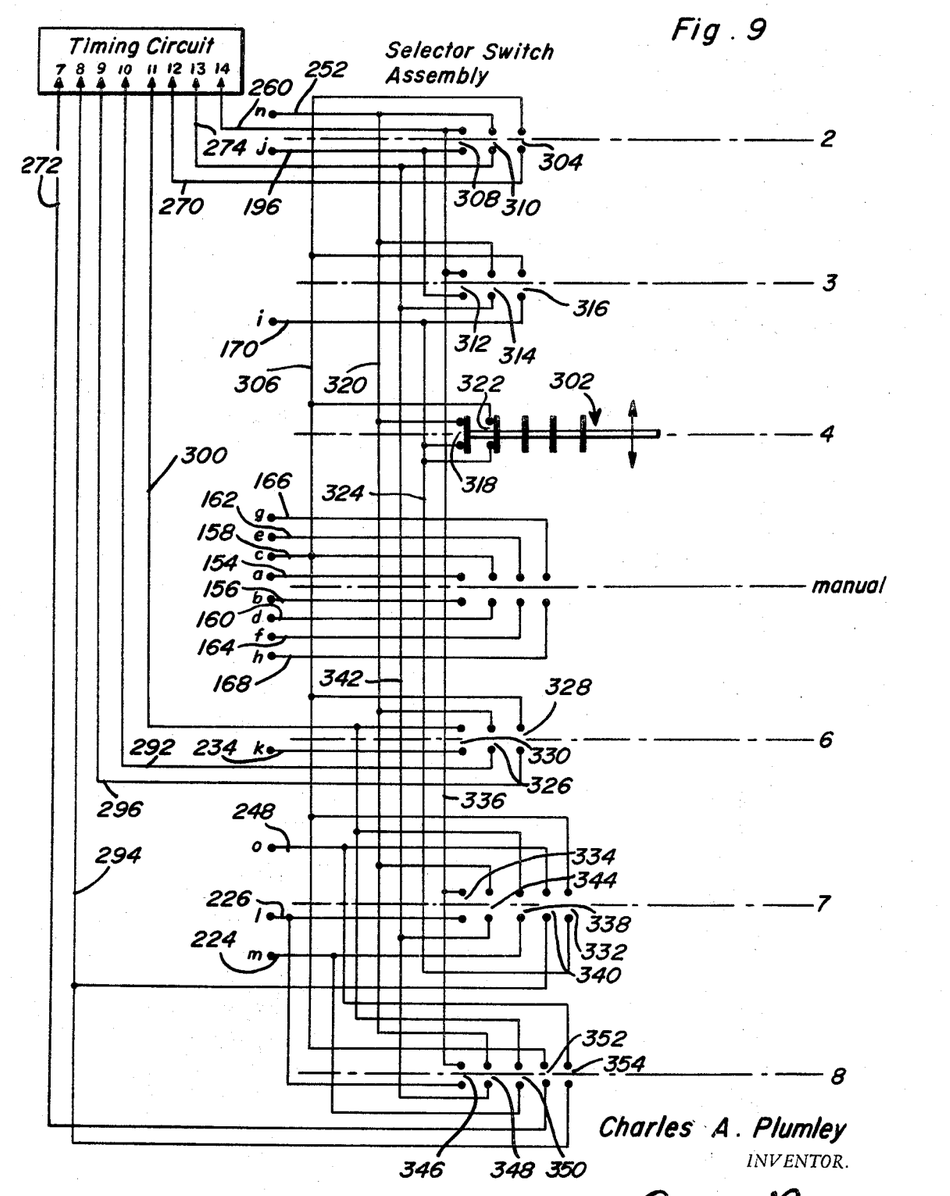

As shown in FIGS. 9 and 10, the selector switch assembly 74 interconnects the timer circuit with the relay component 86 through conductor 196 in positions Nos. 2 and 3, for energizing the long cycle timer 80. Thus, timer 80 is rendered operative to time intermittent gantry travel as diagrammatically shown in FIG. 5. In order to program operation of the cross travel motor 50 for continuous operation in positions Nos. 3, 4 and 7, the voltage supply line 170 is connected to the contacts bridged by the switch contactor 302. Conductor 252 from the motion reversing relay component 90 is connected through conductor 320 to contacts bridged by the contactor 302 in all of the operative positions except the manual position in order to obtain reversal of gantry motion for retracing the motion path selected. In order to select timer 78 for timing the interrupted gantry motion associated with position No. 6 of the selector switch assembly, the conductor 234 from the timer selecting relay component 88 is connected to the contacts associated with position No. 6 of the switch assembly. In order to reverse gantry travel timed by the short cycle timer 80, conductor 248 from the motion reversing relay component 90 is connected to a contact associated with position No. 7 of the selector switch assembly. Since both timers 78 and 80 are utilized to time interrupted gantry travel in positions Nos. 7 and 8 of the selector switch assembly, the conductors 224 and 226 from the timer selecting relay component 88 are connected to the contacts bridged in positions Nos. 7 and 8. Finally, the conductors 154–168 from the motor control component are connected to the contacts associated with the manual position of the selector switch assembly in order to condition the system for manual control through the wobble stick 68 as aforementioned. Thus, as shown in FIG. 9 the contactor 302 bridges from two to five sets of contacts in the various operative positions of the selector switch assembly in order to condition the various circuits necessary to program operation of the drive motors 48 and 50.

AUTOMATIC OPERATION

In position No. 2 of the selector switch assembly, the contactor 302 bridges the set of contacts 304 connecting the conductor 270 to conductor 306 to which contacts in all of the positions of the selector switch assembly are connected. The conductor 306 is connected to conductor 158 so as to complete an energizing circuit through the cross travel control relay 138. This energizing circuit is completed through the normally closed timer switch 264 to which the conductor 270 is connected since the timer switch 164 is connected to the signal line 170 supplied with current upon closing of the automatic switch 72 connecting the signal line 170 to the voltage supply line 114. It will be apparent therefore, that with the selector switch assembly in position No. 2, closing of the automatic switch 72 will initiate operation of the cross travel motor 50 in one direction through the relay 138.

When the spindle translated by the cross travel motor 50 approaches one end of its reciprocatory stroke, cross travel limit switch 172 closes to energize relay coil 180. Upon energization of the relay coil 180, the normally opened relay switches 186 and 188 close to establish a holding circuit directly from line 170 bypassing the limit switch 172 through the normally closed timer switches 262 and 282 interconnected by conductor 280, conductor 184, normally closed relay switch 200 in the relay component 86, conductor 190 and closed relay switch 186 to the relay coil 180. The normally opened relay switch 194 is also closed so that line 170 is connected to the selector switch assembly through conductor 196 which in turn is connected by the contactor 302 bridging the contacts 308 to conductor 260 connected to the timer motor 258 for energizing the timer 80. By energizing the timer 80, the timer switch 264 is opened so as to interrupt the energizing circuit for the cross travel motor relay 138 in order to de-energize the cross travel motor 50. The gantry motor 48 is energized during the ensuing timing cycle since the contactor 302 bridges the contacts 310 connecting the conductor 252 to the conductor 274, the conductor 274 being connected to line 170 through the closed timer switch 266 in order to supply current through conductor 252 and relay switch 244 of the relay component 90 in the unlatched condition to the gantry motor control relay 142 through conductor 250. The relay 142 is thereby energized to operate the gantry motor 48 in one direction. At the end of the timing cycle, the timer switches associated with timer 80 are restored to the positions illustrated in FIG. 10 to thereby interrupt gantry travel at the same time that cross travel motion resumes in a return stroke direction.

As the spindle approaches the end of its return cross travel stroke, the cross travel limit switch 174 closes in order to energize the relay coil 198 associated with the signal transmitting relay component 86. The normally closed relay switch 200 therefore opens in order to de-energize the relay coil 180 while the normally opened relay switch 202 closes to establish a holding circuit for the relay coil 198 from the line 170 bypassing the limit switch 174. Closing of the relay switch 206 on the other hand completes an energizing circuit through the timer motor 258 in order to begin a timing cycle during which the cross travel motor 50 is de-energized and the gantry motor 48 is energized in one direction through the motor control relay 142. Gantry motion is timed once again by the timer 80 with the spindle on the other side of its reciprocatory stroke.

The foregoing sequence of operations is repeated until such time as limit switch 178 is closed at the end of gantry travel. Closing of the limit switch 178 energizes the latching relay 240 in the motion reversing relay component 90 opening relay switch 244 and closing relay switch 254 so as to connect the conductor 252 to the conductor 246 thereby causing energization of the motor control relay 146 instead of the relay 142. Operation of the gantry motor is thereby reversed so that the automatic sequence may continue in such a manner as to repeat a similar motion path in the opposite direction. Such a reversal occurs in the case of all the other automatically programmed motion paths hereafter described under control of limit switches 176 and 178.

In position No. 3 of the selector switch assembly, the contacts 312 and 314 complete the same circuits as hereinbefore described in connection with position No. 2 so as to similarly program operation of the motors 48 and 50 and the timer 80. However, the contacts 316 bridged in position No. 3 directly connect the line 170 to the cross travel control relay 138 through conductors 306 and 158 in order to obtain continuous cross travel motion of the spindle resulting in the path 94 shown in FIG. 5.

In position No. 4 of the selector switch assembly, contacts 318 are bridged to connect line 170 to conductor 320. Conductor 252 is thereby connected through the motor reversing relay component 90 in either the unlatched or latched condition to the motor control relay 142 or 146 associated with the gantry motor 48. Since latching and unlatching of the relay component 90 is controlled by the limit switches 176 and 178, the gantry motor 48 will be continuously energized and reversed at the ends of gantry travel. While the gantry motor is continuously energized, the contacts 322 being bridged in position No. 4 connect the conductor 158 through conductor 306 to the line 170 through conductor 324 in order to maintain the cross travel motor 50 continuously energized through the motor control relay 138. Thus, simultaneous and continuous energization of both the cross travel and gantry motors produces the sinusoidal motion path 96 as illustrated in FIG. 5.

In position No. 6 of the selector switch assembly, the contacts 326 are bridged so as to connect line 170 through the normally closed timer switch 290 of timer 78 through conductor 292 to conductors 320 and 252 establishing a connection through the motion reversing relay component 90 in either the latched or unlatched condition to one of the motor control relays 142 and 146 associated with the gantry motor 48. Thus, gantry travel is produced from one limit position to the other alternatively closing the limit switches 176 and 178 to effect a reversal. However, before the reversal occurs, energization of the gantry motor is interrupted for a period timed by the short cycle timer 78 during which time the cross travel motor 50 is energized. Toward this end, the cross travel control relay 138 is connected through conductors 158 and 306 to the contacts 328 bridged in position No. 6 of the selector switch assembly to complete a relay energizing circuit through conductor 296 and timer switch 288 to line 170 during the timing cycle of timer 78. The timing cycle is initiated by closing of one of the limit switches 176 and 178 which not only latches or unlatches the relay component 90 but latches or unlatches the latching relay assembly associated with relay component 88 and energizes the relay 228. Closing of the normally opened relay switch 230 of relay 228 connects line 170 through conductor 234 to bridged contacts 330 of the selector switch assembly so as to complete an energizing circuit for the timer motor 298 through conductor 300.

Before the timing cycle begins upon energization of the timer motor 298, the holding circuit is completed for the relay 228 through the relay switch 232 connecting line 170 through the normally closed timer switch 284 and conductor 236 to the relay coil. On the other hand, during the timing cycle, closing of the normally opened timer switch 288 energizes the cross travel motor relay 138 as aforementioned so that upon completion of the timing cycle, cross travel motion is interrupted and gantry motion resumes in a reverse direction to produce the motion path 98 during cross travel motion in one direction as illustrated in FIG. 5. A similar motion path is established as cross travel motion in the opposite stroke direction is interrupted for intervals timed by timer 78.

In position No. 7 of the selector switch assembly, the contacts 332 are bridged to interconnect line 170 through conductor 324 to conductor 158 through conductor 306. Thus, the cross travel control relay 138 is continuously energized. When the cross travel limit switch 172 is closed as the end of the cross travel stroke is approached in one direction, relay coil 180 is energized as hereinbefore described closing the normally opened relay switch 188 so as to establish a connection from line 170 through conductor 192 to the relay switches 216 and 220 associated with the latching relay assembly of the relay component 88. In either the latched or unlatched condition of the relay assembly, line 170 is connected through conductor 226 and bridged contacts 334 to conductor 260 through conductor 336 completing an energizing circuit through the timer motor 258 associated with the long cycle timer 80. Thus, the timer 80 is energized to initiate gantry motion by closing of the timer switch 266 as aforementioned for a timed period.

Following the timing cycle, continued cross travel motion in a reverse stroke direction closes the other cross travel limit switch 174 so as to establish a signal by energization of the relay coil 198 as aforementioned. The open relay switch 204 then closes so as to establish a connection from line 170 to the relay component 88 through conductor 210 connected to the relay switches 218 and 222. Thus, in either the latched or unlatched condition of the latching relay assembly, line 170 is connected to the conductor 224 so as to complete an energizing circuit for the timer motor 298 through the bridged contacts 338 in the selector switch assembly and conductor 300 to which the timer motor 298 is connected. Thus during the timing cycle of timer 78, the timer switch 286 is closed connecting line 170 through conductor 294 to the bridged contacts 340 which thereby connect line 170 to conductor 248. The conductor 248 is connected through either the relay switch 242 or 256 to one of the gantry motor control relays 142 and 146 through conductors 246 and 250 in order to reverse the direction of gantry motion when timed by the short cycle timer 78 as compared to its direction when timed by the long cycle timer 80. Thus, a motion path 100 as illustrated in FIG. 5 is established. Closing of one or the other of the gantry motion limit switches 176 and 178 will not only latch or unlatch the relay component 90 but will also latch or unlatch the latching relay assembly associated with relay component 88 in order to obtain the proper directions for gantry motion to establish a similar motion path in the opposite direction upon reversal of the gantry motor at the limit positions of gantry travel Gantry motion is of course timed by timer 80 upon closing of the timer switch 266 connecting line 170 through conductor 274, conductor 324 and bridged contacts 344 to one of the gantry motor control relays 142 and 146 through conductors 320, 252 and relay component 90 as hereinbefore described.

With the selector switch assembly in position No. 8, contacts 346, 348, 350 and 354 are bridged to establish the same circuits as established by bridging of the contacts 334, 344, 338 and 340 when the selector switch assembly is in position No. 7. In this fashion, gantry motion is interrupted, timed and reversed by the timers 78 and 80 as hereinbefore described in connection with the motion path 100. However, whereas cross travel motion is continuous in the case of the motion path 100, the cross travel motion in the case of motion path 102 is interrupted during timed gantry motion. Toward this end, the contacts 352 are bridged in position No. 8 of the selector switch assembly in order to connect line 170 through timer switches 278 and 268 to conductor 272 and bridged contacts 352 to the cross travel control relay 138 through conductor 158. Thus, while both timers are de-energized, the timer switches 278 and 268 will complete an energizing circuit for the motor control relay 138 in order to obtain cross travel motion. However, when either one of the timers is energized, one or the other of the timer switches 278 and 268 will be opened in order to interrupt the energizing circuit for the motor control relay 138 so as to interrupt cross travel motion. While cross travel motion is interrupted by one or the other of the timers, said timer will complete an energizing circuit through the motor control relay 142 or 146 to produce gantry motion as hereinbefore described in connection with position No. 7 of the selector switch assembly.

MANUAL CONTROL AND ADJUSTMENT

In the manual position of the selector switch assembly, the conductors connected to the motor control relays 134, 138, 142 and 146 are interconnected so as to transfer control of the motor control relays to the switches 150 and 152 associated with the wobble stick 68 as aforementioned. Thus, in the manual position both the cross travel and gantry motors may be reversed or deenergized as desired whereas in the other operative positions of the selector switch assembly, energization of the cross travel motor 50 in one direction only and energization of the gantry motor 48 in both directions is automatically programmed under control of the limit switches and the timers. At any time, programmed operation may be stopped by opening of the automatic switch 72. Further, the particular motion path selected may be adjusted by varying the positions of the spindle at which the limit switches are closed and by varying the length of the timing cycles of the timers 78 and 80. For example, the timing cycle of the short cycle timer 78 may be enlarged so as to convert the motion path 98 to movement of the spindle about the perimeter of the slab. Further, by varying the timing cycles of the timers, the number of traversals of the spindle across the width of the slab per unit length may be varied in connection with the motion paths 92, 94, 100 and 102. It will also be appreciated that the operator may readily change programmed operation of the cross travel and gantry motors from one motion path to another not only for different materials being treated by the machine but for the same slab of material during the surface treating operation. Also, as previously suggested, the speeds of the motors 48 and 50 may be changed by suitable push button controls where plural speed motors are utilized. Further, other specific motion paths may be obtained by different combinations of programmed signals produced in accordance with the principles of the present invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a pair of drive motors, a driven member, and means for transmitting unidirectional movement and reciprocatory movement to the driven member in a common plane along relatively transverse paths in response to energization of said drive motors, a path selecting control system operatively connected to said drive motors for energization thereof comprising limit signal means for establishing spaced signals in response to travel of the driven member along said transverse paths toward predetermined limit positions, timing means for establishing limited periods of travel during which said drive motors impart movement to the driven member, means connected to the drive motors for intermittently interrupting movement imparted to the driven member in response to said spaced signals from the limit signal means, signal transmitting means connecting the limit segnal means to the timing means for selecting the periods of travel to which the driven member is intermittently limited along one of the transverse paths, and motion selecting means connecting the timing means and the signal transmitting means to the drive motors for energizing and de-energizing the drive motors in response to said spaced signals and for said selected periods of travel in accordance with a preselected motion pattern.

2. The combination of claim 1 including motion reversing means connected to the limit signal means for reversing movement of the driven member in one of said transverse directions in response to approach thereof to two of said limit positions.

3. The combination of claim 2 wherein said motion selecting means comprises a multiposition switch mechanism having at least three positions in which movement in one of the transverse directions is continuous, at least one position in which movement in the other transverse direction is continuous and simultaneous with movement in said one of the transverse directions, at least one position in which said reciprocatory movement is interrupted by the timing means, and at least one position in which the unidirectional movement is interrupted and alternatively reversed by the motion reversing means.

4. The combination of claim 1 wherein said motion selecting means comprises a multiposition switch mechanism having at least three positions in which movement in one of the transverse directions is continuous, at least one position in which movement in the other transverse direction is continuous and simultaneous with movement in said one of the transverse directions, at least one position in which said reciprocatory movement is interrupted by the timing means, and at least one position in which the unidirectional movement is interrupted.

5. In combination with a pair of drive motors, a driven member, and means drivingly connected to the drive motors for transmitting unidirectional movement and reciprocatory movement to the driven member along relatively transverse paths in one plane, a path selecting control system operatively connected to said drive motors for energization thereof comprising means for simultaneously energizing both of the drive motors continuously, motion limiting means for intermittently de-energizing said drive motors, timing means for limiting energization of said drive motors to periods of predetermined duration, and motion selecting means connected to the motion limiting means and the timing means for selectively disabling the same to obtain programmed energization and de-energization of the drive motors producing a preselected motion pattern for the driven member.

6. The combination of claim 5 wherein said motion limiting means comprises limit switches actuated by one of the drive motors, relay means for de-energizing said one of the drive motors and energizing the other of the drive motors in response to actuation of the limit switches, said relay means being connected to the timing means for limiting said energization of the other of the drive motors to said period of predetermined duration.

7. The combination of claim 5 wherein said timing means includes a first timer having a relatively long timing cycle for regulating the duration of said unidirectional movement and a second timer having a relatively short timing cycle regulating the duration of said reciprocatory movement.

8. In combination with a pair of drive motors, a driven member, and means for transmitting unidirectional movement and reciprocatory movement to the driven member in relatively transverse directions in response to energization of said drive motors, a path selecting control system operatively connected to said drive motors for energization thereof comprising means for simultaneously energizing both of the drive motors continuously, motion limiting means for intermittently de-energizing said drive motors, timing means for limiting energization of said drive motors to periods of predetermined duration, and motion selecting means connected to the motion limiting means and the timing means for selectively disabling the same to obtain programmed energization and de-energization of the drive motors producing a preselected path of motion for the driven member, said motion limiting means comprising limit switches actuated by one of the drive motors, relay means for de-energizing said one of the drive motors and energizing the other of the drive motors in response to actuation of the limit switches, said relay means being connected to the timing means for limiting said energization of the other of the drive motors to said period of predetermined duration, said timing means including a first timer having a relatively long timing cycle for regulating the duration of said unidirectional movement and a second timer having a relatively short timing cycle regulating the duration of said reciprocatory movement.

9. The combination of claim 8 including motion reversing means operatively connected to one of the drive motors for reversing said unidirectional movement of the driven member at limit positions thereof, and means connecting the motion reversing means to the timing means for changing the duration of the period during which one of the drive motors is energized.

10. In combination with a surface treating machine having a rotating abrading tool and power operated drive means for translating said tool across a stationary surface to be treated, automatic programming means connected to said drive means for controlling operation thereof to continuously translate the tool along one of a plurality of predetermined motion paths on said surface, and control means connected to the programming means for selecting one of the motion paths along which the tool is translated.

11. The combination of claim 10 wherein said drive means includes a pair of drive motors respectively imparting reciprocatory and unidirectional movement to the tool, said programming means including means for timing the periods during which said drive motors are energized, limit means actuated by the drive motors for interrupting and reversing energization thereof, and motor control means operatively connecting the timing means and the limit means to the drive motors for energization and de-energization thereof in accordance with a program preset by the selector means.

12. In a machine having a surface treating member and a pair of drive motors energized for imparting translatory movement to the member, limit switches actuated by one of the drive motors, relay means for de-energizing said one of the motors and energizing the other of the motors in response to actuation of said limit switches, and timing means connected to said relay means for limiting energization of said drive motors to different timing periods, said timing means including a pair of timers having different timing cycles predetermining the duration of said timing periods during which the motors respectively impart translatory movement to the surface treating member.

References Cited

UNITED STATES PATENTS

| 1,707,460 | 4/1929 | Deale | 318—39 |
| 2,029,335 | 2/1936 | Oberhoffken et al. | 318—39 |
| 2,131,107 | 9/1938 | Krause | 318—39 X |
| 2,360,375 | 10/1944 | Tutiya | 318—162 X |
| 2,370,222 | 2/1945 | Bennett et al. | 318—39 X |
| 2,488,337 | 11/1949 | Selby et al. | 318—162 X |

THOMAS E. LYNCH, Primary Examiner

U.S. Cl. X.R.

318—162